(12) United States Patent
Moon et al.

(10) Patent No.: US 11,309,567 B2
(45) Date of Patent: Apr. 19, 2022

(54) ION EXCHANGE MEMBRANE AND FLOW BATTERY INCLUDING SAME

(71) Applicant: LG CHEM, LTD., Seoul (KR)

(72) Inventors: Sikwon Moon, Daejeon (KR); Sungyeon Kim, Daejeon (KR); Tae Geun Noh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 218 days.

(21) Appl. No.: 16/623,104

(22) PCT Filed: Apr. 3, 2019

(86) PCT No.: PCT/KR2019/003931
§ 371 (c)(1),
(2) Date: Dec. 16, 2019

(87) PCT Pub. No.: WO2019/221387
PCT Pub. Date: Nov. 21, 2019

(65) Prior Publication Data
US 2020/0127315 A1  Apr. 23, 2020

(30) Foreign Application Priority Data
May 17, 2018  (KR) .................. 10-2018-0056466

(51) Int. Cl.
*H01M 8/18* (2006.01)
*H01M 8/1053* (2016.01)
(Continued)

(52) U.S. Cl.
CPC ......... *H01M 8/188* (2013.01); *H01M 8/1053* (2013.01); *H01M 8/1067* (2013.01);
(Continued)

(58) Field of Classification Search
CPC .. H01M 8/188; H01M 8/1053; H01M 8/1067; H01M 8/20; H01M 2008/1095; H01M 2300/0094
See application file for complete search history.

(56) References Cited

U.S. PATENT DOCUMENTS

2007/0128425 A1   6/2007  Hadj Romdhane et al.
2012/0045704 A1*  2/2012  Choudhury ........... H01M 4/881
                                                   429/428
(Continued)

FOREIGN PATENT DOCUMENTS

JP   2006059756    *  3/2006
JP   2007-42561 A     2/2007
(Continued)

OTHER PUBLICATIONS

International Search Report issued in PCT/KR2019/003931 (PCT/ISA/210), dated Jul. 10, 2019.

*Primary Examiner* — Matthew W Van Oudenaren
(74) *Attorney, Agent, or Firm* — Birch, Stewart, Kolasch & Birch, LLP

(57) ABSTRACT

An ion exchange membrane including a first ion exchange resin layer with a first and a second surface; a second ion exchange resin layer on the first surface of the first ion exchange resin layer; and a third ion exchange resin layer on the second surface of the first ion exchange resin layer, wherein the second ion exchange resin layer and the third ion exchange resin layer each independently include an ionomer having a higher equivalent weight (EW) than an ionomer of the first ion exchange resin layer.

9 Claims, 7 Drawing Sheets

(51) Int. Cl.
    *H01M 8/10*         (2016.01)
    *H01M 8/20*         (2006.01)
    *H01M 8/1067*     (2016.01)

(52) U.S. Cl.
    CPC ...... *H01M 8/20* (2013.01); *H01M 2008/1095* (2013.01); *H01M 2300/0094* (2013.01)

(56) References Cited

U.S. PATENT DOCUMENTS

| | | | |
|---|---|---|---|
| 2012/0202099 A1* | 8/2012 | Perry | H01M 8/20 429/105 |
| 2015/0311541 A1 | 10/2015 | Lloyd et al. | |
| 2016/0126579 A1 | 5/2016 | Darling et al. | |
| 2017/0309927 A1 | 10/2017 | Moon et al. | |

FOREIGN PATENT DOCUMENTS

| | | |
|---|---|---|
| JP | 2007042561 * | 2/2007 |
| JP | 2013-168365 A | 8/2013 |
| JP | 2014-135144 A | 7/2014 |
| KR | 10-2015-0062496 A | 6/2015 |
| KR | 10-2016-0008594 A | 1/2016 |
| KR | 2016-501438 A | 1/2016 |
| KR | 10-2016-0035565 A | 3/2016 |
| WO | WO 2014/099874 A1 | 6/2014 |
| WO | WO 2017/184229 A2 | 10/2017 |

* cited by examiner

[FIG. 1]
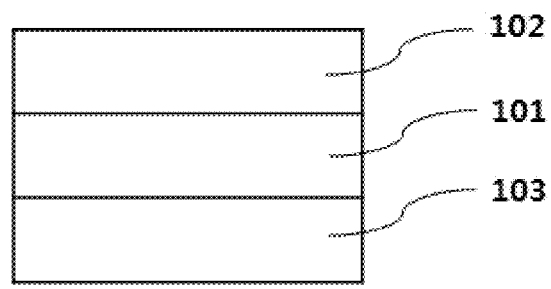
[FIG. 2]
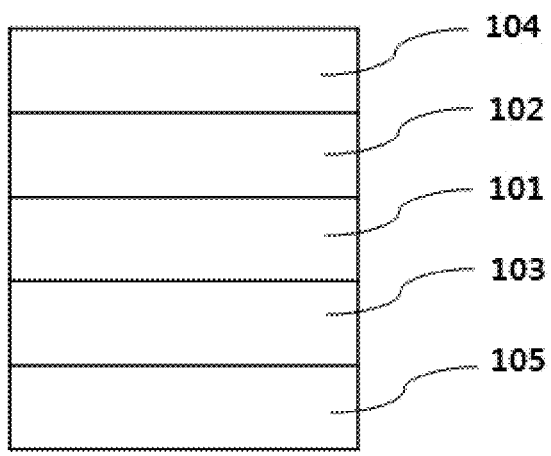

[FIG. 3]
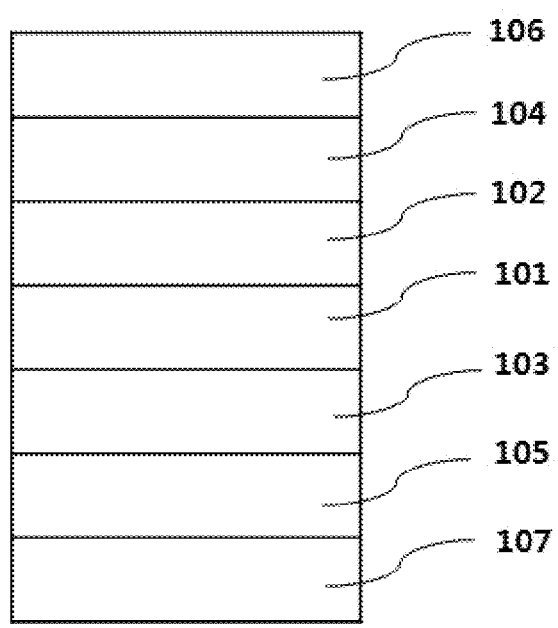

[FIG. 4]
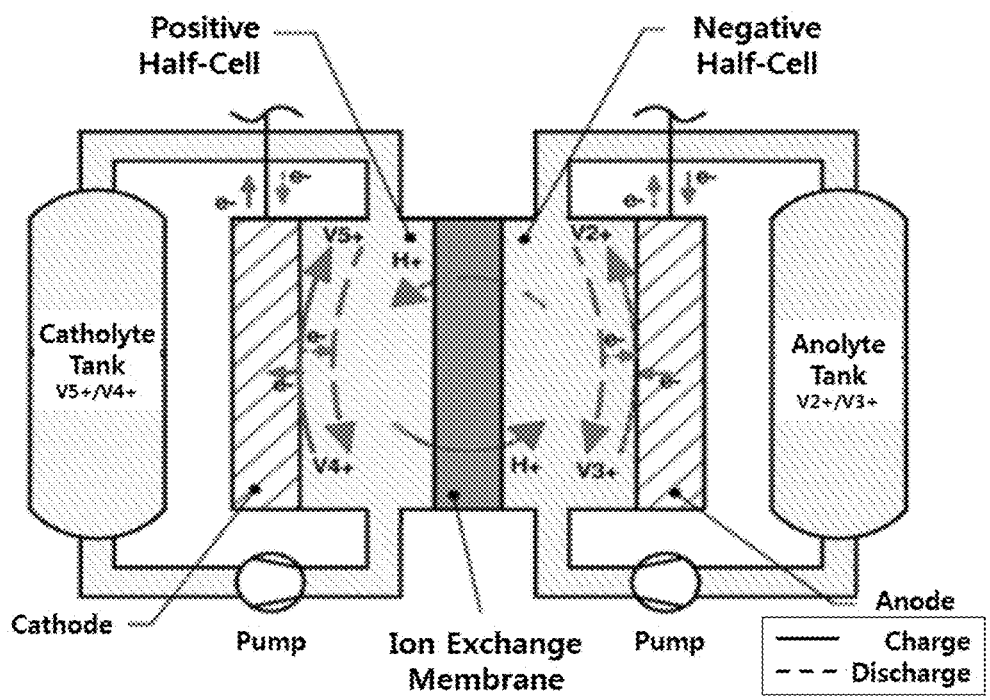
[FIG. 5]
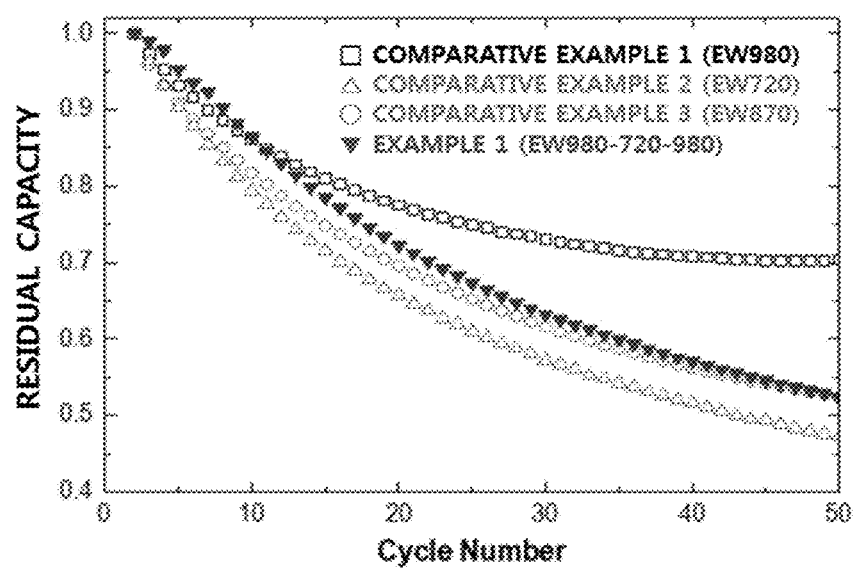

[FIG. 6]
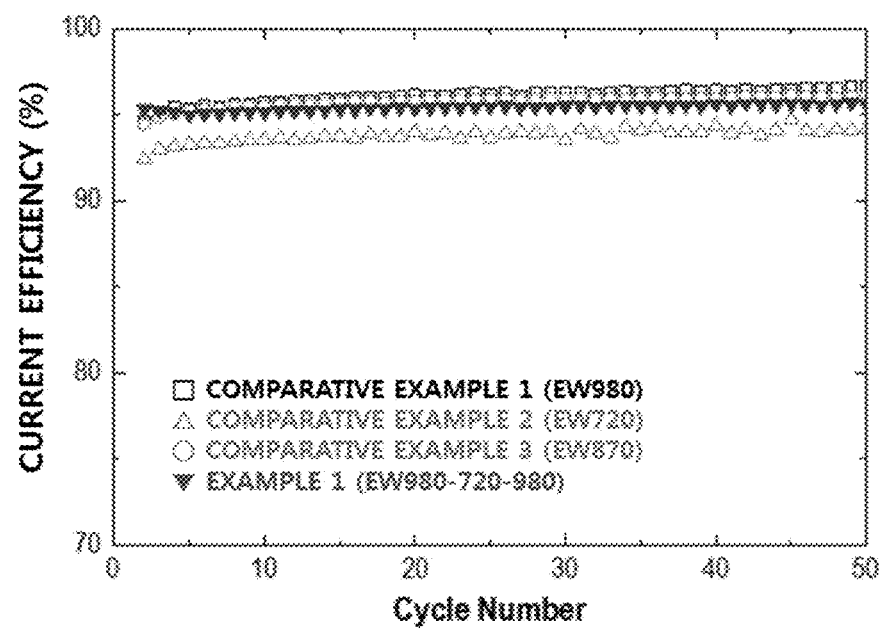
[FIG. 7]
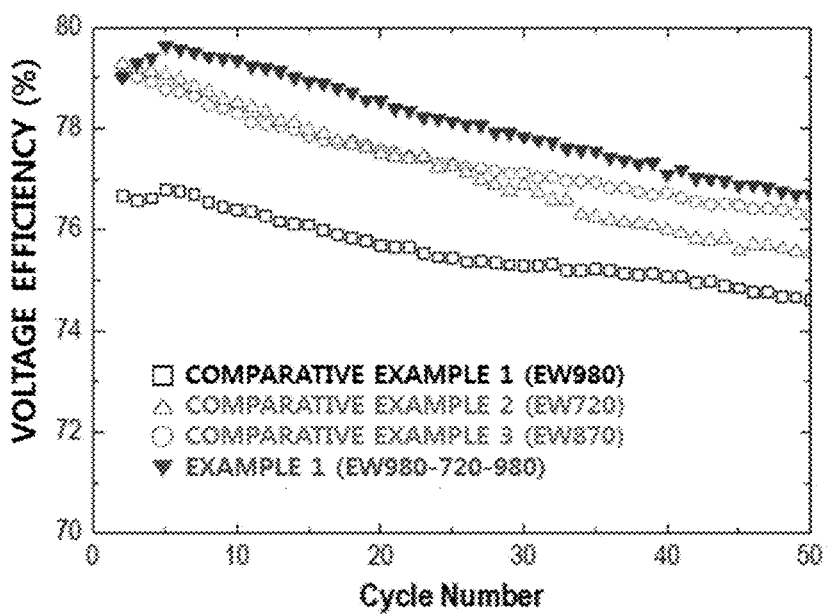

[FIG. 8]
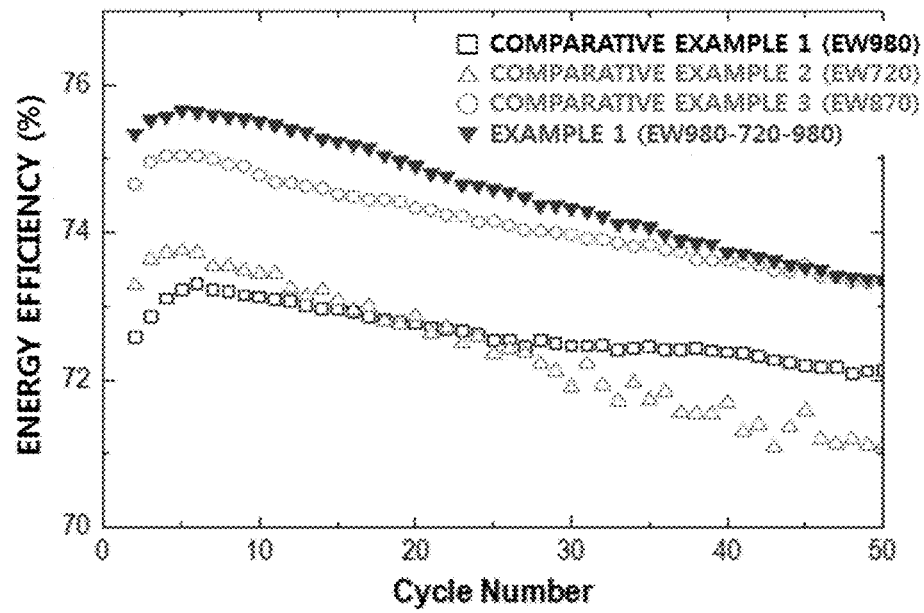
[FIG. 9]
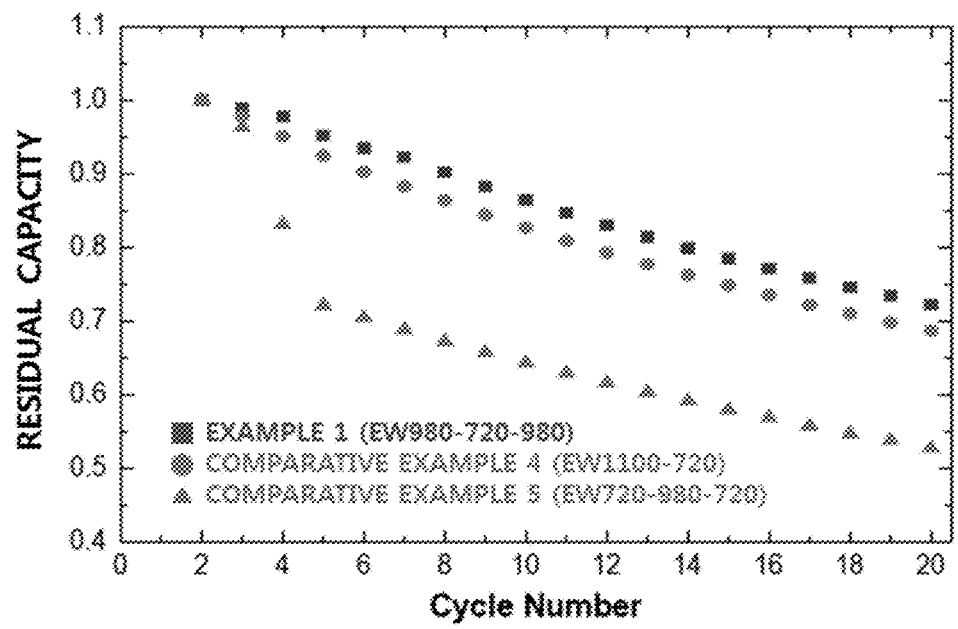

[FIG. 10]
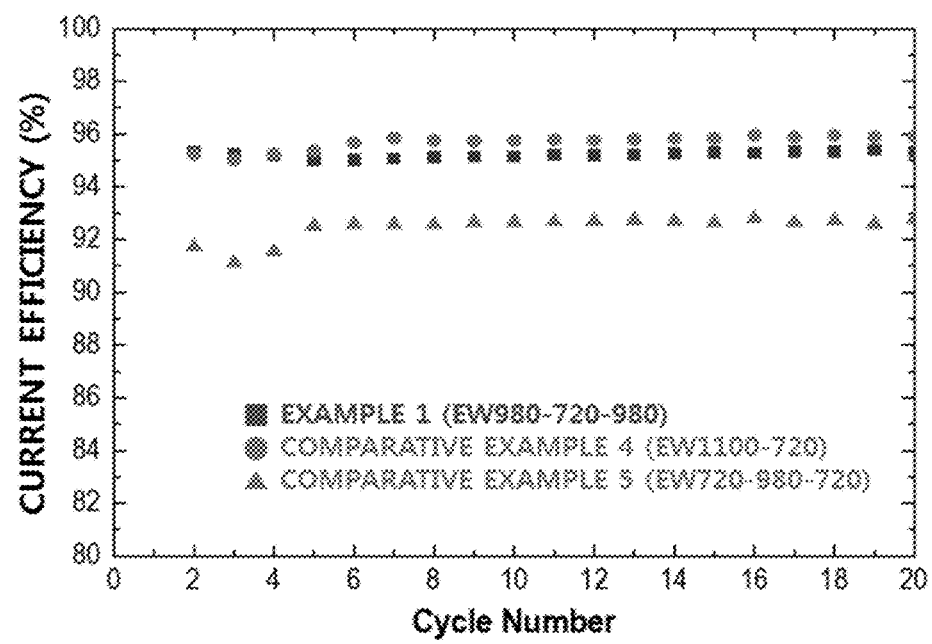
[FIG. 11]
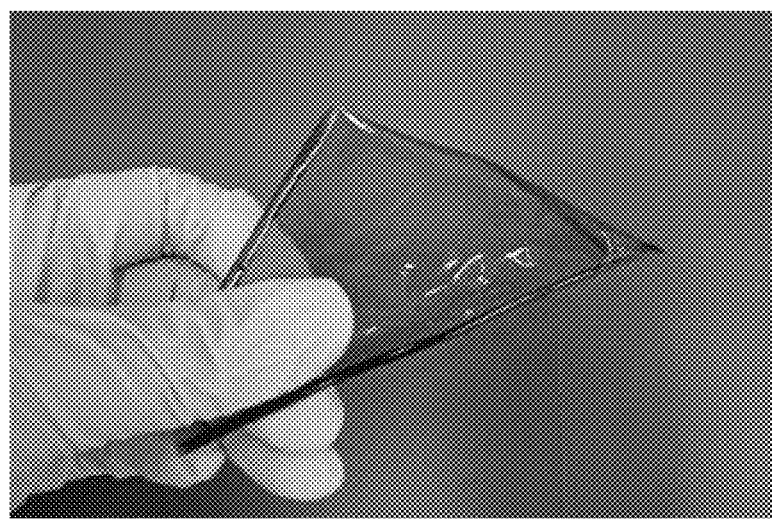

[FIG. 12]
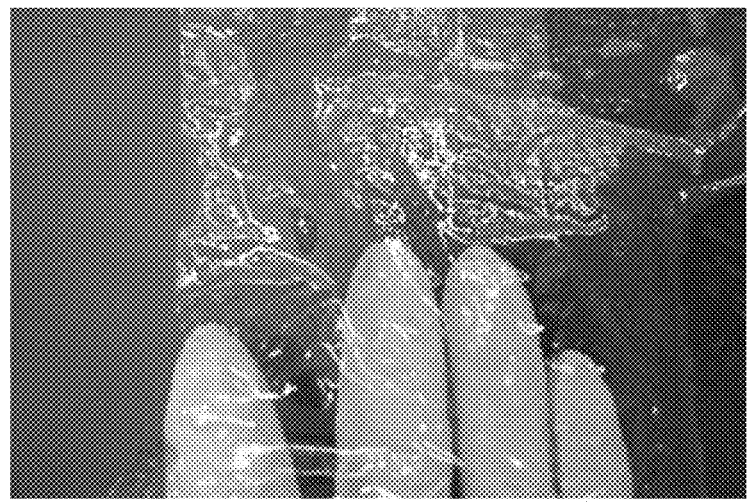
[FIG. 13]
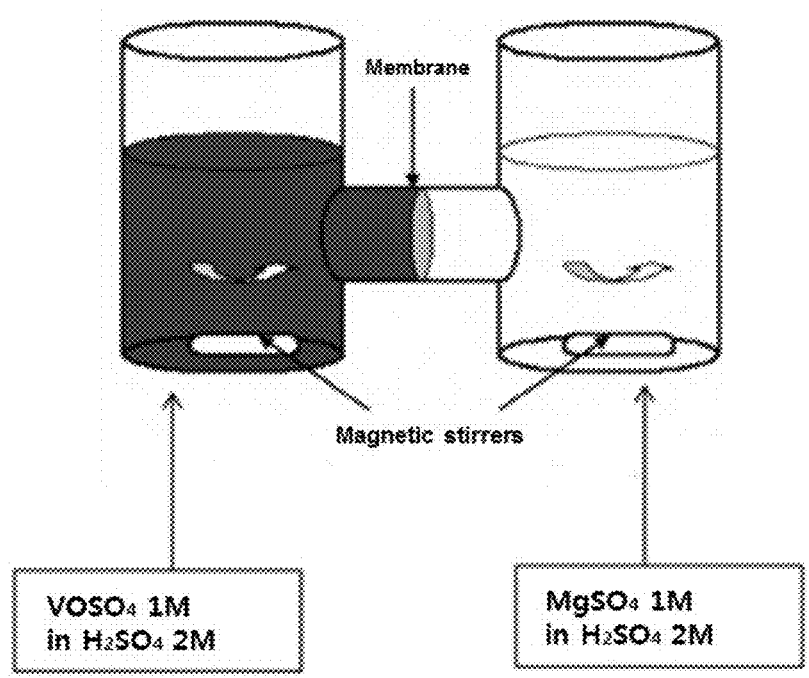

ION EXCHANGE MEMBRANE AND FLOW BATTERY INCLUDING SAME

TECHNICAL FIELD

This application claims priority to and the benefits of Korean Patent Application No. 10-2018-0056466, filed with the Korean Intellectual Property Office on May 17, 2018, the entire contents of which are incorporated herein by reference.

The present specification relates to an ion exchange membrane, and a flow battery including the same.

BACKGROUND ART

As existing power generation systems such as thermal power generation causing problems of greenhouse gas generation and environmental pollution due to the use of fossil fuels, or nuclear power generation having problems of facility stability and waste disposal have revealed various limitations, researches on the development of energy that is more environmental-friendly and has high efficiency, and the development of power supply systems using the same have greatly increased recently. As a result, development of secondary batteries capable of converting electric energy to chemical energy, storing the chemical energy, and converting the chemical energy back to electric energy when necessary, and capable of weight lightening has been actively progressed.

Particularly, as a large-capacity power storage system, a lithium ion battery, a sodium sulfur battery, a redox flow battery, an ultra-high capacity capacitor, a lead acid battery and the like have been developed, and among these, a redox flow battery (RFB) has attracted attention as a high capacity and high efficiency secondary battery most suitable for large-sized systems.

Unlike other batteries, such a redox flow battery is a battery using ions in an aqueous solution state as an active material instead of a solid state, and having a mechanism of storing energy by a redox reaction of each of the ions in a positive electrode and a negative electrode. Types such as V/Br, Zn/Br and V/V may be included depending on the redox couple, and among these, a vanadium redox flow battery (VRFB) have been more extensively studied compared to other redox flow battery types since it may use the same type of redox material in a cathode and an anode as well as having a high open-circuit voltage.

A vanadium redox flow battery uses an electrolyte liquid as a carrier medium, and therefore, an ion exchange membrane is required, and the ion exchange membrane is a key material determining lifetime and manufacturing cost of the vanadium redox flow battery. In order to be actually applied to a system using a strong acid material including a transition metal as an electrolyte liquid, the ion exchange membrane needs to have excellent acid resistance and oxidation resistance, and low permeability and excellent mechanical properties are required.

Particularly, it is important that the ion exchange membrane prevents vanadium ions ($V^{4+}$ and $V^{5+}$) of a positive electrode electrolyte liquid from being crossed over to a negative electrode electrolyte liquid, or vanadium ions ($V^{2+}$ and $V^{3+}$) of a negative electrode electrolyte liquid from being crossed over to a positive electrode electrolyte liquid. This is due to the fact that, when a crossover occurs, a positive electrode electrolyte liquid and a negative electrode electrolyte liquid are contaminated declining battery performance. In addition, as hydrogen ion permeability increases during charge and discharge, internal resistance of a battery decreases, and battery performance may be enhanced.

Accordingly, development of an ion exchange membrane having high hydrogen ion permeability while preventing a positive electrode electrolyte liquid and a negative electrode electrolyte liquid from being crossed over to each other has been required.

DISCLOSURE

Technical Problem

The present specification is directed to providing an ion exchange membrane, and a flow battery including the same.

Technical Solution

One embodiment of the present specification provides an ion exchange membrane including a first ion exchange resin layer; and a second ion exchange resin layer and a third ion exchange resin layer each provided on both surfaces of the first ion exchange resin layer, wherein the first to the third ion exchange resin layers each include one or more types of ionomers, and the ionomer included in each of the second ion exchange resin layer and the third ion exchange resin layer has a higher equivalent weight (EW) than the ionomer of the first ion exchange resin layer.

Another embodiment of the present specification provides a flow battery including a negative electrode; a positive electrode; and the ion exchange membrane provided between the negative electrode and the positive electrode.

Advantageous Effects

An ion exchange membrane according to one embodiment of the present specification is capable of enhancing battery performance by effectively preventing a positive electrode electrolyte liquid and a negative electrode electrolyte liquid from being crossed over to each other.

The ion exchange membrane according to one embodiment of the present specification has high hydrogen ion permeability during charge and discharge, and is thereby capable of enhancing battery performance.

DESCRIPTION OF DRAWINGS

FIG. 1 illustrates an example of an ion exchange membrane according to one embodiment of the present specification.

FIG. 2 illustrates an example of an ion exchange membrane according to another embodiment of the present specification.

FIG. 3 illustrates an example of an ion exchange membrane according to still another embodiment of the present specification.

FIG. 4 illustrates a general structure of a flow battery.

FIG. 5 shows residual capacity for single cells of Example 1 and Comparative Examples 1 to 3 depending on the number of times of charge and discharge.

FIG. 6 shows current efficiency for single cells of Example 1 and Comparative Examples 1 to 3 depending on the number of times of charge and discharge.

FIG. 7 shows voltage efficiency for single cells of Example 1 and Comparative Examples 1 to 3 depending on the number of times of charge and discharge.

FIG. 8 shows energy efficiency for single cells of Example 1 and Comparative Examples 1 to 3 depending on the number of times of charge and discharge.

FIG. 9 shows residual capacity for single cells of Example 1 and Comparative Examples 4 and 5 depending on the number of times of charge and discharge.

FIG. 10 shows current efficiency for single cells of Example 1 and Comparative Examples 4 and 5 depending on the number of times of charge and discharge.

FIG. 11 and FIG. 12 are photographs of appearances of membranes prepared in Comparative Examples 4 and 5, respectively.

FIG. 13 illustrates a structure of an H-shaped cell used for measuring vanadium ion permeability in Experimental Example 2.

REFERENCE NUMERAL

101: First Ion Exchange Resin Layer
102: Second Ion Exchange Resin Layer
103: Third Ion Exchange Resin Layer
104: Fourth Ion Exchange Resin Layer
105: Fifth Ion Exchange Resin Layer
106: Sixth Ion Exchange Resin Layer
107: Seventh Ion Exchange Resin Layer

MODE FOR DISCLOSURE

Unlike other batteries, a redox flow battery is a battery using ions in an aqueous solution state as an active material instead of a solid state, and having a mechanism of storing energy by a redox reaction of each of the ions in a positive electrode and a negative electrode. Types such as V/Br, Zn/Br and V/V may be included depending on the redox couple, and among these, a vanadium redox flow battery (VRFB) have been more extensively studied compared to other redox flow battery types since it may use the same type of redox material in a cathode and an anode as well as having a high open-circuit voltage.

A vanadium redox flow battery uses an electrolyte liquid as a carrier medium, and therefore, an ion exchange membrane is required, and the ion exchange membrane is a key material determining lifetime and manufacturing cost of the vanadium redox flow battery. In order to be actually applied to a system using a strong acid material including a transition metal as an electrolyte liquid, the ion exchange membrane needs to have excellent acid resistance and oxidation resistance, and low permeability and excellent mechanical properties are required.

Particularly, it is important that the ion exchange membrane prevents vanadium ions ($V^{4+}$ and $V^{5+}$) of a positive electrode electrolyte liquid from being crossed over to a negative electrode electrolyte liquid, or vanadium ions ($V^{2+}$ and $V^{3+}$) of a negative electrode electrolyte liquid from being crossed over to a positive electrode electrolyte liquid. This is due to the fact that, when a crossover occurs, a positive electrode electrolyte liquid and a negative electrode electrolyte liquid are contaminated declining battery performance. In addition, as hydrogen ion permeability increases during charge and discharge, internal resistance of a battery decreases, and battery performance may be enhanced.

The ion exchange membrane according to one embodiment of the present specification is capable of enhancing battery performance by effectively preventing a positive electrode electrolyte liquid and a negative electrode electrolyte liquid from being crossed over to each other.

Specifically, when an EW is high, the number of sulfonic acids per unit weight of a polymer gradually decreases, which reduces hydrogen ion conductivity, however, a crossover of vanadium ions is also reduced. On the other hand, when an EW is low, the number of sulfonic acids per unit weight of a polymer gradually increases, which increases hydrogen ion conductivity, however, a crossover of vanadium ions also increases. Accordingly, in an ion exchange membrane formed in a single layer, it is difficult to obtain an effect of reducing a crossover while increasing hydrogen ion conductivity.

In the ion exchange membrane according to one embodiment of the present specification, a first ion exchange resin layer including an ionomer having a lowest EW is provided, and then second and third ion exchange resin layers including ionomers having a higher EW than the ionomer of the first ion exchange resin layer are each provided on both surfaces of the first ion exchange resin layer, and as a result, a crossover of vanadium ions may be effectively prevented while increasing hydrogen ion conductivity.

The ion exchange membrane according to one embodiment of the present specification has high hydrogen ion permeability during charge and discharge, and therefore, battery performance may be enhanced.

Hereinafter, the present specification will be described in more detail.

In the present specification, a description of a certain part "including" certain constituents means capable of further including other constituents, and does not exclude other constituents unless particularly stated on the contrary.

One embodiment of the present specification provides an ion exchange membrane including a first ion exchange resin layer; and a second ion exchange resin layer and a third ion exchange resin layer each provided on both surfaces of the first ion exchange resin layer, wherein the first to the third ion exchange resin layers each include one or more types of ionomers, and the ionomer included in each of the second ion exchange resin layer and the third ion exchange resin layer has a higher equivalent weight (EW) than the ionomer of the first ion exchange resin layer.

FIG. 1 illustrates an example of the ion exchange membrane according to one embodiment of the present specification. In FIG. 1, a structure of the ion exchange membrane having a second ion exchange resin layer (102) and a third ion exchange resin layer (103) each provided on a first ion exchange resin layer (101) is illustrated.

Specifically, by the ion exchange membrane according to one embodiment of the present specification being provided with a multilayered ion exchange resin layer, an effect of preventing a crossover of vanadium ions while increasing hydrogen ion conductivity may be obtained.

In addition, by the ion exchange membrane according to one embodiment of the present specification being provided with second and third ion exchange resin layers including ionomers having a higher EW than an ionomer of a first ion exchange resin layer on both surfaces of the first ion exchange resin layer, a crossover may be effectively prevented compared to an asymmetric form having a layer provided on only one surface of a first ion exchange resin layer. Specifically, when a second ion exchange resin layer is provided on only one surface of a first ion exchange resin layer, a crossover occurring on a surface opposite to the surface provided with the second ion exchange resin layer may not be prevented.

In the present specification, the EW (equivalent weight) means a weight of a polymer having 1 equivalent of sulfonic acid, and the unit is g/mol or g/eq.

The EW may be obtained by calculating the number of moles of sulfonic acid per 1 g through titration. For example, a polymer corresponding to 1 g is introduced to 3 M NaCl, and after stirring the result for 1 day, a 0.1 M NaOH standard solution is added until the pH becomes 7, and the EW may be calculated through the following Equation 1.

$$EW\left(\frac{g}{mol}\right) = \frac{m}{[NaOH] \times V_{NaOH}} \times 1000 \quad \text{[Equation 1]}$$

*m=polymer mass=1 g
*[NaOH]=0.1 M
*$V_{NaOH}$=volume of introduced NaOH

According to one embodiment of the present specification, the first to the third ion exchange resin layers each include one or more types of ionomers having an EW of greater than or equal to 500 g/mol and less than or equal to 1,100 g/mol, and includes one or more types of ionomers having an EW of preferably greater than or equal to 700 g/mol and less than or equal to 1,000 g/mol, and more preferably greater than or equal to 720 g/mol and less than or equal to 980 g/mol.

According to one embodiment of the present specification, in the ion exchange membrane including the first to the third ion exchange resin layers, the first ion exchange resin layer includes one or more types of ionomers having an EW of greater than or equal to 500 g/mol and less than or equal to 900 g/mol, preferably greater than or equal to 650 g/mol and less than or equal to 870 g/mol, and more preferably greater than or equal to 720 g/mol and less than or equal to 830 g/mol, and in this case, the second ion exchange resin layer and the third ion exchange resin layer each include one or more types of ionomers having an EW of greater than 900 g/mol and less than or equal to 1,100 g/mol, preferably greater than 900 g/mol and less than or equal to 1,000 g/mol, and more preferably greater than or equal to 930 g/mol and less than or equal to 980 g/mol.

According to one embodiment of the present specification, the first to the third ion exchange resin layers each have a thickness of preferably greater than or equal to 5 µm and less than or equal to 30 µm, more preferably 5 µm to 25 µm, and most preferably 7 µm to 20 µm. When each thickness of the first to the third ion exchange resin layers does not satisfy the above-mentioned thickness range, energy efficiency decreases.

Particularly, when the thickness of the first ion exchange resin layer is less than 5 µm, an effect of enhancing hydrogen ion conductivity is not high, and the thickness being greater than 30 µm has a disadvantage in that it is difficult to identify effects of other layers.

According to one embodiment of the present specification, the ion exchange membrane includes a fourth ion exchange resin layer provided on a surface opposite to the surface in contact with the first ion exchange resin layer of the second ion exchange resin layer, and a fifth ion exchange resin layer provided on a surface opposite to the surface in contact with the first ion exchange resin layer of the third ion exchange resin layer, the fourth ion exchange resin layer and the fifth ion exchange resin layer each include one or more types of ionomers, and the ionomer included in each of the fourth ion exchange resin layer and the fifth ion exchange resin layer has a higher EW than the ionomers of the second ion exchange resin layer and the third ion exchange resin layer.

FIG. 2 illustrates an example of the ion exchange membrane according to another embodiment of the present specification. In FIG. 2, a structure of the ion exchange membrane having a third ion exchange resin layer (103) provided on a fifth ion exchange resin layer (105), a first ion exchange resin layer (101) provided on the third ion exchange resin layer, a second ion exchange resin layer (102) provided on the first ion exchange resin layer, and a fourth ion exchange resin layer (104) provided on the second ion exchange resin layer is illustrated.

According to one embodiment of the present specification, the first to the fifth ion exchange resin layers each include one or more types of ionomers having an EW of greater than or equal to 500 g/mol and less than or equal to 1,100 g/mol, and includes one or more types of ionomers having an EW of preferably greater than or equal to 700 g/mol and less than or equal to 1,000g/mol, and more preferably greater than or equal to 720 g/mol and less than or equal to 980 g/mol.

According to one embodiment of the present specification, in the ion exchange membrane including the first to the fifth ion exchange resin layers, the first ion exchange resin layer includes one or more types of ionomers having an EW of greater than or equal to 500 g/mol and less than or equal to 750 g/mol, preferably greater than or equal to 650 g/mol and less than or equal to 720 g/mol, and more preferably greater than or equal to 700 g/mol and less than or equal to 720 g/mol, and in this case, the second ion exchange resin layer and the third ion exchange resin layer each include one or more types of ionomers having an EW of greater than 750 g/mol and less than or equal to 900 g/mol, preferably greater than or equal to 790 g/mol and less than or equal to 870 g/mol, and more preferably greater than or equal to 790 g/mol and less than or equal to 830 g/mol, and the fourth ion exchange resin layer and the fifth ion exchange resin layer each include one or more types of ionomers having an EW of greater than 900 g/mol and less than or equal to 1,100 g/mol, preferably greater than 900 g/mol and less than or equal to 1000 g/mol, and more preferably greater than or equal to 930 g/mol and less than or equal to 980 g/mol.

According to one embodiment of the present specification, the thicknesses of the fourth ion exchange resin layer and the fifth ion exchange resin layer are the same as or different from each other, and each preferably greater than or equal to 5 µm and less than or equal to 30 µm, more preferably from 5 µm to 20 µm, and most preferably from 7 µm to 15 µm.

The thickness of each of the ion exchange resin layers may be adjusted during a process of coating the ion exchange membrane. For example, when coating the ion exchange membrane using a bar-coater, the thickness of the formed separator varies depending on the height difference between the bar and the bottom, and the thickness of the ion exchange resin layer may be adjusted therethrough.

According to one embodiment of the present specification, the ion exchange membrane may include a multilayer structure in which the outer layer is an ion exchange resin layer including an ionomer having the highest EW in the same manner as described above.

For example, the ion exchange membrane includes a sixth ion exchange resin layer provided on a surface opposite to the surface in contact with the second ion exchange resin layer of the fourth ion exchange resin layer, and a seventh ion exchange resin layer provided on a surface opposite to the surface in contact with the third ion exchange resin layer of the fifth ion exchange resin layer, the sixth ion exchange resin layer and the seventh ion exchange resin layer each include one or more types of ionomers, and the ionomer included in each of the sixth ion exchange resin layer and the seventh ion exchange resin layer has a higher EW than the ionomers of the fourth ion exchange resin layer and the fifth ion exchange resin layer.

FIG. 3 illustrates an example of the ion exchange membrane according to still another embodiment of the present specification. In. FIG. 3, a structure of the ion exchange membrane having a fifth ion exchange resin layer (105) provided on a seventh ion exchange resin layer (107), a third ion exchange resin layer (103) provided on the fifth ion exchange resin layer, a first ion exchange resin layer (101) provided on the third ion exchange resin layer, a second ion exchange resin layer (102) provided on the first ion exchange resin layer, a fourth ion exchange resin layer (104) provided on the second ion exchange resin layer, and a sixth ion exchange resin layer provided on the fourth ion exchange resin layer is illustrated.

According to one embodiment of the present specification, the first to the seventh ion exchange resin layers each include one or more types of ionomers having an EW of greater than or equal to 500 g/mol and less than or equal to 1,100 g/mol, and includes one or more types of ionomers having an EW of preferably greater than or equal to 700 g/mol and less than or equal to 1,000 g/mol, and more preferably greater than or equal to 720 g/mol and less than or equal to 980 g/mol.

According to one embodiment of the present specification, in the ion exchange membrane including the first to the seventh ion exchange resin layers, the first ion exchange resin layer includes one or more types of ionomers having an EW of greater than or equal to 500 g/mol and less than or equal to 790 g/mol, preferably greater than or equal to 650 g/mol and less than or equal to 720 g/mol, and more preferably greater than or equal to 700 g/mol and less than or equal to 720 g/mol, and in this case, the second ion exchange resin layer and the third ion exchange resin layer each include one or more types of ionomers having an EW of greater than 790 g/mol and less than or equal to 870 g/mol, the fourth ion exchange resin layer and the fifth ion exchange resin layer each include one or more types of ionomers having an EW of greater than 870 g/mol and less than or equal to 930 g/mol, and the sixth ion exchange resin layer and the seventh ion exchange resin layer each include one or more types of ionomers having an EW of greater than 930 g/mol and less than or equal to 1,100 g/mol, preferably greater than 930 g/mol and less than or equal to 980 g/mol, and more preferably greater than or equal to 950 g/mol and less than or equal to 960 g/mol.

According to one embodiment of the present specification, the thicknesses of the sixth ion exchange resin layer and the seventh ion exchange resin layer are the same as or different from each other, and each preferably greater than or equal to 5 μm and less than or equal to 30 μm, more preferably from 5 μm to 20 μm, and most preferably from 7 μm to 15 μm.

According to one embodiment of the present specification, the ion exchange membrane preferably has a thickness of greater than or equal to 15 μm and less than or equal to 200 μm, more preferably greater than or equal to 20 μm and less than or equal to 100 μm, and most preferably greater than or equal to 20 μm and less than or equal to 50 μm. Specifically, when the ion exchange membrane has a thickness of greater than or equal to 20 μm and less than or equal to 50 μm, highest efficiency is obtained.

One embodiment of the present specification provides a flow battery including a negative electrode; a positive electrode; and the ion exchange membrane provided between the negative electrode and the positive electrode.

As illustrated in FIG. 4, the flow battery of the present specification may be formed with a negative electrode tank (anolyte tank) and a positive electrode tank (catholyte tank) respectively storing a negative electrode electrolyte liquid or a positive electrode electrolyte liquid; pumps each connected to the negative electrode tank and the positive electrode tank to supply the electrolyte liquid to a negative electrode and a positive electrode; a positive electrode cell (positive half-cell) and a negative electrode cell (negative half-cell) in which vanadium ions, an active material in the electrolyte liquid, are oxidized and reduced; and the ion exchange membrane provided between the positive electrode cell and the negative electrode cell. FIG. 4 illustrates the flow battery of the present specification, and the flow battery is not limited thereto.

The positive electrode means an electrode reduced by receiving electrons when discharged, and, on the contrary, may perform a role of a negative electrode (oxidation electrode) exporting electrons when charging a battery by a positive electrode active material being oxidized.

The negative electrode means an electrode exporting electrons by being oxidized when discharged, and, on the contrary, may perform a role of a positive electrode (reduction electrode) reduced by receiving electrons when charging a battery.

The positive electrode and the negative electrode each include a current collector; and porous carbon such as carbon felt provided between the current collector and the membrane, and the positive electrode means a region capable of charging and discharging electric energy by the positive electrode electrolyte liquid reacting while being injected and discharged from the positive electrode tank, and the negative electrode means a region capable of charging and discharging electric energy by the negative electrode electrolyte liquid reacting while being injected and discharged from the negative electrode tank.

The positive electrode electrolyte liquid and the negative electrode electrolyte liquid may respectively include a positive electrode active material and a negative electrode active material as an electrolyte liquid active material. The positive electrode active material means a material reduced by receiving electrons when discharged and exporting electrons by being oxidized when charged, and the negative electrode active material means a material exporting electrons by being oxidized when discharged and reduced by receiving electrons when charged.

When the electrolyte liquid active material of the flow battery is a vanadium ion, the positive electrode electrolyte liquid may include at least one of $V^{5+}$ and $V^{4+}$, and the negative electrode electrolyte liquid may include at least one of $V^{2+}$ and $V^{3+}$.

The positive electrode electrolyte liquid and the negative electrode electrolyte liquid may further include a solvent, and the solvent is not particularly limited as long as it is capable of dissolving the electrolyte liquid active material, and examples thereof may include an aqueous sulfuric acid solution, an aqueous hydrochloric acid solution, an aqueous nitric acid solution and a mixed solution thereof.

A molar concentration of the acid in the aqueous sulfuric acid solution, the aqueous hydrochloric acid solution, the aqueous nitric acid solution or a mixed solution thereof may be greater than or equal to 1 M and less than or equal to 6 M. In other words, a molar number of the acid in 1 liter of the electrolyte liquid may be greater than or equal to 1 mol and less than or equal to 6 mol. Herein, the acid means sulfuric acid, hydrochloric acid, nitric acid or a mixture thereof, and the aqueous sulfuric acid solution, the aqueous hydrochloric acid solution, the aqueous nitric acid solution or a mixed solution thereof refers to respectively adding sulfuric acid, hydrochloric acid, nitric acid or a mixture thereof to water.

The flow battery may be a vanadium flow battery. Specifically, the flow battery may be a vanadium flow battery in which the positive electrode electrolyte liquid includes at least one of $V^{5+}$ and $V^{4+}$, and the negative electrode electrolyte liquid includes at least one of $V^{2+}$ and $V^{3+}$.

One embodiment of the present specification provides a battery module including the flow battery as a unit cell.

The battery module may be formed by inserting a bipolar plate between the flow batteries of the present specification and staking the result.

The battery module may specifically be used as a power supply of electric vehicles, hybrid electric vehicles, plug-in hybrid electric vehicles or power storage systems.

Hereinafter, the present specification will be described in detail with reference to examples. However, examples according to the present specification may be modified to various other forms, and the scope of the present specification is not to be construed as being limited to the examples described below. Examples of the present specification are provided in order to more fully describe the present specification to those having average knowledge in the art.

EXAMPLE

Properties of an ionomer solution used in the experiment are as follows.
Manufacturer: Solvay
Structure of Aquivion:

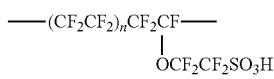

AquivionE98 solution: EW 980 g/mol, 25 wt % in $H_2O$
AquivionE72 solution: EW 720 g/mol, 25 wt % in $H_2O$
AquivionE83 solution: EW 830 g/mol, 25 wt % in $H_2O$
AquivionE79 solution: EW 790 g/mol, 25 wt % in $H_2O$ Example 1

An AquivionE98 solution was formed as a film using a 100 μm thickness coating bar to form a third ion exchange resin layer. Thereon, an AquivionE72 solution was formed as a film using a 200 μm thickness coating bar to form a first ion exchange resin layer. An AquivionE98 solution was formed as a film thereon using a 300 μm thickness coating bar to form a second ion exchange resin layer. After that, in a circulating oven, the result was dried for 3 hours at 80° C., 15 hours at 180° C. and 4 minutes at 200° C., and then dipped in distilled water for swelling to prepare ion exchange membrane 1 having each layer thickness as in the following Table 1.

TABLE 1

| Layer | Thickness (μm) |
|---|---|
| Second Ion Exchange Resin Layer | 15 |
| First Ion Exchange Resin Layer | 20 |
| Third Ion Exchange Resin Layer | 15 |
| Ion Exchange Membrane 1 (Final) | 50 |

Example 2

An AquivionE98 solution was formed as a film using a 50 μm thickness coating bar to form a fifth ion exchange resin layer. Thereon, an AquivionE83 solution was formed as a film using a 100 μm thickness coating bar to form a third ion exchange resin layer. An AquivionE72 solution was formed as a film thereon using a 150 μm thickness coating bar to form a first ion exchange resin layer. An AquivionE83 solution was formed as a film thereon using a 200 μm thickness coating bar to form a second ion exchange resin layer. Thereon, an AquivionE98 solution was formed as a film using a 250 μm thickness coating bar to form a fourth ion exchange resin layer. After that, in a circulating oven, the result was dried under the same condition as in Example 1, and then dipped in distilled water for swelling to prepare ion exchange membrane 2 having each layer thickness as in the following Table 2.

TABLE 2

| Layer | Thickness (μm) |
|---|---|
| Fourth Ion Exchange Resin Layer | 12 |
| Second Ion Exchange Resin Layer | 10 |
| First Ion Exchange Resin Layer | 9 |
| Third Ion Exchange Resin Layer | 10 |
| Fifth Ion Exchange Resin Layer | 12 |
| Ion Exchange Membrane 2 (Final) | 53 |

Comparative Example 1

An AquivionE98 solution was formed as a film using a 300 μm thickness coating bar to form a single layer ion exchange resin layer. After that, in a circulating oven, the result was dried under the same condition as in Example 1, and then dipped in distilled water for swelling to prepare ion exchange membrane A having a thickness of 50 μm.

Comparative Example 2

An AquivionE72 solution was formed as a film using a 300 μm thickness coating bar to form a single layer ion exchange resin layer. After that, in a circulating oven, the result was dried under the same condition as in Example 1, and then dipped in distilled water for swelling to prepare ion exchange membrane B having a thickness of 50 μm.

Comparative Example 3

An AquivionE98 solution and an AquivionE72 solution were mixed in a weight ratio of 65:35 to prepare an ionomer solution having an EW of 870 g/mol. This was formed as a film using a 300 μm thickness coating bar to form a single layer ion exchange resin layer. After that, in a circulating oven, the result was dried under the same condition as in Example 1, and then dipped in distilled water for swelling to prepare ion exchange membrane C having a thickness of 50 μm.

Comparative Example 4

An AquivionE72 solution was formed as a film using a 100 μm thickness coating bar to form a first ion exchange resin layer. On the first ion exchange resin layer, an ionomer solution (Nafion manufactured by Dupont (25 wt % in water/isopropanol)) having an EW of 1,100 g/mol was formed as a film using a 300 μm thickness coating bar to form a second ion exchange resin layer. After that, in a circulating oven, the result was dried under the same condition as in Example 1, and then dipped in distilled water for swelling to prepare ion exchange membrane D having each layer thickness as in the following Table 3.

TABLE 3

| Layer | Thickness (μm) |
|---|---|
| Second Ion Exchange Resin Layer | 15 |
| First Ion Exchange Resin Layer | 35 |
| Ion Exchange Membrane D (Final) | 50 |

Comparative Example 5

An AquivionE72 solution was formed as a film using a 100 μm thickness coating bar to form a third ion exchange resin layer. Thereon, an AquivionE98 solution was formed as a film thereon using a 200 μm thickness coating bar to form a first ion exchange resin layer. An AquivionE72 solution was formed as a film thereon using a 300 μm thickness coating bar to form a second ion exchange resin layer. After that, in a circulating oven, the result was dried under the same condition as in Example 1, and then dipped in distilled water for swelling to prepare ion exchange membrane E having each layer thickness as in the following Table 4.

TABLE 4

| Layer | Thickness (μm) |
|---|---|
| Second Ion Exchange Resin Layer | 15 |
| First Ion Exchange Resin Layer | 20 |
| Third Ion Exchange Resin Layer | 15 |
| Ion Exchange Membrane E (Final) | 50 |

Experimental Example 1: Evaluation on VRFB Single Cell Performance

For each of the membranes prepared in the examples and the comparative examples, charge and discharge evaluation was conducted through a single cell, and the results are shown in the following Table 5.

As the single cell, carbon felt was installed on a unit cell having an active area of 25 $cm^2$ as an electrode and each of the membranes of the examples and the comparative examples was installed, and as an electrolyte liquid, vanadium 1.6 M, sulfuric acid 2 M aqueous solution (manufacturer: OXKEM) was used.

To both of the electrodes, the electrolyte liquid (50 mL each) was supplied through circulation at a rate of 1 mL/min·$cm^2$, and with a current of 200 mA/$cm^2$, charging to 1.7 V and discharging to 0.8 V was repeated 50 times.

TABLE 5

| | Average EW (g/mol) | Membrane Thickness (μm) | Residual Capacity (%) | Average Efficiency of 20 Times | | |
|---|---|---|---|---|---|---|
| | | | | Current Efficiency (%) | Voltage Efficiency (%) | Energy Efficiency (%) |
| Example 1 | 876 | 50 | 72.3 | 95.2 | 79.1 | 75.4 |
| Comparative Example 1 | 980 | 50 | 77.5 | 95.7 | 76.3 | 73 |
| Comparative Example 2 | 720 | 50 | 69.5 | 95.4 | 78.3 | 74.7 |
| Comparative Example 3 | 870 | 50 | 65.7 | 93.5 | 78.4 | 73.3 |
| Comparative Example 4 | 834 | 50 | 68.7 | 95.6 | 77.8 | 74.4 |
| Comparative Example 5 | 876 | 50 | 52.7 | 92.5 | 79.3 | 73.4 |

In Table 5, residual capacity measures capacity of the battery after conducting the charge and discharge test 50 times, and average efficiency of 20 times represents an average value of current, voltage and energy efficiency measured for the first 20 times. The energy efficiency represents, after measuring each energy during charge/discharge, an energy value during discharge with respect to energy during charge as a percentage. The average EW is a value obtained by multiplying the EW value of the ionomer used in each layer by the thickness of each layer, and dividing the product by the total thickness. Through the results of Table 5, it was seen that energy efficiency of Example 1 was the highest. In addition, when comparing Example 1 (EW 876), Comparative Example 3 (EW 870) and Comparative Example 5 (EW 876) having similar EW values, it was identified that residual capacity of Example 1 was the highest.

FIGS. 5 to 8 are graphs presenting residual capacity, current efficiency, voltage efficiency and energy efficiency for each of the single cells of Example 1 and Comparative Examples 1 to 3 depending on the number of charge and discharge. Specifically, residual capacity of FIG. 5 presents the ratio when employing 100% as 1.0.

When comparing Comparative Examples 1 to 3 in FIG. 5, it was seen that residual capacity greatly decreased as the EW value decreased. When the EW value is small, the number of sulfonic acids increases resulting in high ion conductivity and vanadium ion permeability (cross-over) is also high, and as a result, residual capacity rapidly decreases. Herein, when comparing Example 1 (EW 876) and Comparative Example 3 (EW 870) having similar EW values, it was identified that Example 1 having a multilayer structure had a lower residual capacity decrease rate compared to Comparative Example 3 having a single layer structure.

When comparing Comparative Examples 1 to 3 in FIG. 6, it was seen that current efficiency was low as the EW value decreased. When the EW value is small, the number of sulfonic acids increases resulting in high ion conductivity and vanadium ion permeability (cross-over) is also high, and as a result, current efficiency decreases. When comparing Example 1 (EW 876) and Comparative Example 3 (EW 870) having similar EW values, similar current efficiency was identified, and it was identified that current efficiency was not reduced despite that Example 1 has a multilayer structure.

When comparing Comparative Examples 1 to 3 in FIG. 7, it was seen that voltage efficiency was high as the EW value decreased. When the EW value is small, the number of sulfonic acids increases resulting in high ion conductivity, and as a result, voltage efficiency is enhanced. It was identified that Example 1 had higher voltage efficiency compared to Comparative Examples 1 to 3 by a maximum of approximately 3%.

In FIG. 8, it was identified that Example 1 had higher energy efficiency compared to Comparative Examples 1 to 3 due to the above-described enhancement in the current efficiency and the voltage efficiency.

Residual capacity of FIG. 9 shows the ratio when employing 100% as 1.0 with respect to residual capacity up to 20 times of the charge and discharge test.

Through FIG. 9 and FIG. 10, it was identified that, compared to Comparative Example 4 having an asymmetric structure in which a second ion exchange resin layer including an ionomer having a higher EW than an ionomer of a first ion exchange resin layer is provided only on one surface, Example 1 maintained the same level of current efficiency while having a smaller residual capacity decrease rate. In addition, it was identified that, compared to Comparative Example 5 in which, on both surfaces of a first ion exchange resin layer, a second and a third ion exchange resin layers including an ionomer having a lower EW value than an ionomer of the first ion exchange resin layer are formed, Example 1 maintained the same level of current efficiency while having a smaller residual capacity decrease rate.

In addition, FIGS. 11 and 12 are photographs of the appearances of the membranes prepared in Comparative Examples 4 and 5, respectively, and it was identified that, in Comparative Example 4, the membrane was curled when dipped in water since the degree of swelling on both sides was different when wetted due to the asymmetric structure. In this case, workability becomes inferior making it difficult to tighten a battery. Meanwhile, it was identified that, in Comparative Example 5, the membrane was not curled since it has a symmetric structure regardless of the EW value.

Experimental Example 2: Evaluation on Vanadium Ion Permeability

Vanadium ion permeability was measured by installing the prepared membrane on the center of the H-shaped cell as in FIG. 13. Specifically, 190 ml of a vanadium solution (1 M $VOSO_4$ and 2 M sulfuric acid ($H_2SO_4$) aqueous solution) was introduced to one side, and 190 ml of a magnesium sulfate solution (1 M $MgSO_4$ and 2 M sulfuric acid ($H_2SO_4$) aqueous solution) was introduced to the other side. After that, a time-dependent concentration of permeated vanadium ions was identified through ICP-OES (Optima 8300). The permeability was calculated using the following Equation 2, and the results are shown in the following Table 6.

$$V\frac{dCt}{dt} = S\frac{P}{L}(Co - Ct) \quad \text{[Equation 2]}$$

In Equation 2,
V means a volume of a sulfuric acid solution,
$C_o$ means an initial concentration of vanadium ions in a magnesium sulfate tank,
$C_t$ means a concentration of vanadium ions in a magnesium sulfate tank at the time of t,
S means an area of a film in contact with a sulfuric acid solution,
P means vanadium ion permeability, and
L means a film thickness.

TABLE 6

|  | Example 1 | Example 2 | Comparative Example 1 | Comparative Example 2 | Comparative Example 3 | Comparative Example 4 | Comparative Example 5 |
|---|---|---|---|---|---|---|---|
| Vanadium Ion Permeability ($\times 10^{-6}$ $cm^2$/min) | 4.77 | 4.24 | 4.54 | 7.02 | 6.39 | 5.84 | 6.12 |

As the EW value decreases, vanadium ion permeability increases while increasing ion conductivity, and therefore, it was identified through the results of Table 6 reducing vanadium ion permeability while enhancing ion conductivity that vanadium ion permeability of Examples 1 and 2 was reduced by 25% or more compared to Comparative Example 3 having a similar EW value. This is due to the fact that the ion exchange resin layer of the outer layer including an ionomer having a large EW value performs a role of preventing vanadium ion permeation. In other words, when preparing an ion exchange membrane according to one embodiment of the present specification, a membrane having low vanadium ion permeability while having high ion conductivity due to a small EW value may be prepared.

The invention claimed is:
1. An ion exchange membrane comprising:
a first ion exchange resin layer having a first and a second surface;
a second ion exchange resin layer on the first surface of the first ion exchange resin layer;

a third ion exchange resin layer on the second surface of the first ion exchange resin layer;

a fourth ion exchange resin layer on a surface of the second ion exchange resin layer which is opposite to the surface in contact with the first surface of the first ion exchange resin layer; and a fifth ion exchange resin layer on a surface of the third ion exchange resin layer which is opposite to the surface in contact with the second surface of the first ion exchange resin layer, wherein the first, second, third, fourth and fifth ion exchange resin layers each independently comprise one or more ionomer, and the one or more ionomer included in each of the second ion exchange resin layer and the third ion exchange resin layer has a higher equivalent weight (EW) than the one or more ionomer of the first ion exchange resin layer; and the one or more ionomer included in each of the fourth ion exchange resin layer and the fifth ion exchange resin layer has a higher EW than the one or more ionomer of the second ion exchange resin layer and the third ion exchange resin layer.

2. The ion exchange membrane of claim 1, wherein the first, second and third ion exchange resin layers each independently comprise one or more ionomer having an EW of greater than or equal to 500 g/mol and less than or equal to 1,100 g/mol.

3. The ion exchange membrane of claim 1, wherein the first ion exchange resin layer comprises one or more ionomer having an EW of greater than or equal to 500 g/mol and less than or equal to 900 g/mol; and the second ion exchange resin layer and the third ion exchange resin layer each independently comprise one or more ionomer having an EW of greater than 900 g/mol and less than or equal to 1,100 g/mol.

4. The ion exchange membrane of claim 1, wherein the first, second and third ion exchange resin layers each have a thickness of greater than or equal to 5 μm and less than or equal to 30 μm.

5. The ion exchange membrane of claim 1, wherein the first, second, third, fourth and fifth ion exchange resin layers each independently comprise one or more ionomer having an EW of greater than or equal to 500 g/mol and less than or equal to 1,100 g/mol.

6. The ion exchange membrane of claim 1, wherein the first ion exchange resin layer comprises one or more ionomer having an EW of greater than or equal to 500 g/mol and less than or equal to 750 g/mol;

the second ion exchange resin layer and the third ion exchange resin layer each independently comprise one or more ionomer having an EW of greater than 750 g/mol and less than or equal to 900 g/mol; and the fourth ion exchange resin layer and the fifth ion exchange resin layer each independently comprise one or more ionomer having an EW of greater than 900 g/mol and less than or equal to 1,100 g/mol.

7. The ion exchange membrane of claim 1, wherein the first, second, third, fourth and fifth ion exchange resin layers each have a thickness of greater than or equal to 5 μm and less than or equal to 30 μm.

8. The ion exchange membrane of claim 1, wherein the ion exchange membrane has a thickness of greater than or equal to 15 μm and less than or equal to 200 μm.

9. A flow battery comprising:

a negative electrode;

a positive electrode; and the ion exchange membrane of claim 1 provided between the negative electrode and the positive electrode.

* * * * *